US010360783B2

(12) United States Patent
Maher et al.

(10) Patent No.: US 10,360,783 B2
(45) Date of Patent: Jul. 23, 2019

(54) ANOMALY DETECTION SYSTEMS AND METHODS

(71) Applicant: Intertrust Technologies Corporation, Sunnyvale, CA (US)

(72) Inventors: David P. Maher, Livermore, CA (US); Michael Tamir, Alameda, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 15/615,687

(22) Filed: Jun. 6, 2017

(65) Prior Publication Data

US 2017/0352245 A1    Dec. 7, 2017

Related U.S. Application Data

(60) Provisional application No. 62/346,333, filed on Jun. 6, 2016.

(51) Int. Cl.
*G07C 3/14* (2006.01)
*G08B 21/18* (2006.01)
(Continued)

(52) U.S. Cl.
CPC .......... *G08B 21/18* (2013.01); *G08B 21/182* (2013.01); *G08B 21/187* (2013.01); *H04L 63/1425* (2013.01); *H04L 63/20* (2013.01); *G07C 3/14* (2013.01); *G08B 21/185* (2013.01); *H04L 12/28* (2013.01); *H04L 12/2803* (2013.01); *H04L 12/2807* (2013.01); *H04L 63/0428* (2013.01); *Y02B 10/30* (2013.01)

(58) Field of Classification Search
CPC ......... G06F 11/66; G06F 21/554; G07C 3/14; G08B 21/18; G08B 21/182; G08B 21/185; G08B 21/187; H04L 43/10; H04L 63/14; H04L 63/1425; H04L 63/1433; H04L 63/1441; H04L 63/123; H04L 63/20
USPC ........................................................ 340/540
See application file for complete search history.

(56) References Cited

U.S. PATENT DOCUMENTS

| 8,779,921 B1 * | 7/2014 | Curtiss ................. G08B 25/009 340/506 |
| 2011/0060569 A1 * | 3/2011 | Lynn .................... G06F 11/0739 703/6 |

(Continued)

FOREIGN PATENT DOCUMENTS

WO    WO 2016/048788 A1    3/2016

OTHER PUBLICATIONS

International Search Report and Written Opinion dated Sep. 12, 2017, received in related International Application No. PCT/US2017/036193 (10 pages).

*Primary Examiner* — Quan-Zhen Wang
*Assistant Examiner* — Stephen R Burgdorf
(74) *Attorney, Agent, or Firm* — Finnegan, Henderson, Farabow, Garrett & Dunner, LLP

(57) ABSTRACT

This disclosure relates to the analysis of data generated by one or more connected systems and devices. Operational data obtained by one or more connected devices and/or systems, such as a connected thermostat and/or wind turbine system, may be used to detect and/or predict impending failures and/or suboptimal performance. By detecting and/or predicting anomalous system and device performance, various actions may be taken to improve system and device performance and mitigate failure conditions.

8 Claims, 11 Drawing Sheets

(51) Int. Cl.
    *H04L 12/28*       (2006.01)
    *H04L 29/06*       (2006.01)

(56) References Cited

U.S. PATENT DOCUMENTS

| | | |
|---|---|---|
| 2013/0247194 A1 | 9/2013 | Jha et al. |
| 2014/0137239 A1 | 5/2014 | Baluda et al. |
| 2015/0051847 A1* | 2/2015 | Angello ................ F01D 21/003 702/35 |
| 2015/0163121 A1 | 6/2015 | Mahaffey et al. |
| 2015/0321605 A1 | 11/2015 | Mirza et al. |
| 2016/0095013 A1* | 3/2016 | Faivishevsky ......... G08C 25/00 370/252 |
| 2016/0149612 A1* | 5/2016 | Julson ..................... H04B 3/46 375/224 |
| 2016/0291552 A1* | 10/2016 | Pal ....................... G05B 13/026 |
| 2017/0060124 A1* | 3/2017 | Hara .................. G05B 23/0221 |
| 2017/0160110 A1* | 6/2017 | Basu ........................ G01D 1/16 |
| 2017/0241958 A1* | 8/2017 | Matsumoto ............ G01N 29/30 |

* cited by examiner

ANOMALY DETECTION SYSTEMS AND METHODS

RELATED APPLICATIONS

This application claims the benefit of priority under 35 U.S.C. § 119(e) to U.S. Provisional Application No. 62/346,333, filed Jun. 6, 2016, and entitled "ANOMALY DETECTION SYSTEMS AND METHODS," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to the analysis of data generated by one or more connected systems and/or devices. More specifically, but not exclusively, the present disclosure relates to analyzing data generated by connected systems and/or device devices to detect and/or predict impending failures and/or suboptimal performance.

Connected systems and devices have become an important part of our lives. As the use of the Internet is increasingly intrinsic to people's daily activities, more personal electronic devices are becoming interconnected. A variety of Internet-connected devices are now available to consumers as part of a connected-device ecosystem that utilizes the existing Internet infrastructure called the Internet of Things ("IoT"). The IoT provides connectivity that makes a variety of computing devices (i.e., things) and groups of devices more useful. Various industrial systems and devices are also becoming increasingly interconnected. For example, wind turbines (e.g., arrays of wind turbines included in a wind farm) may communicate with one or more control systems configured to manage and/or improve the operation of the wind turbines.

Connected systems and devices in the IoT may also allow for the collection of unprecedented amounts of data relating to the systems and/or their associated users, thereby facilitating an understanding of environments, user behaviors, and/or how well various systems and/or devices perform. The interconnection of systems and/or devices may further allow for control and/or automation of various systems and/or devices, thereby improving the interaction between interconnected systems and/or devices.

Systems and methods disclosed herein facilitate the collection and analysis of various data generated by one or more connected systems and/or devices. Certain embodiments disclosed herein allow for analyzing various data generated by connected systems and/or devices to detect and/or predict impending system and/or device failures and/or suboptimal performance. By detecting and/or predicting anomalous system and device performance, various actions may be taken to improve system and/or device performance and mitigate failure conditions.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
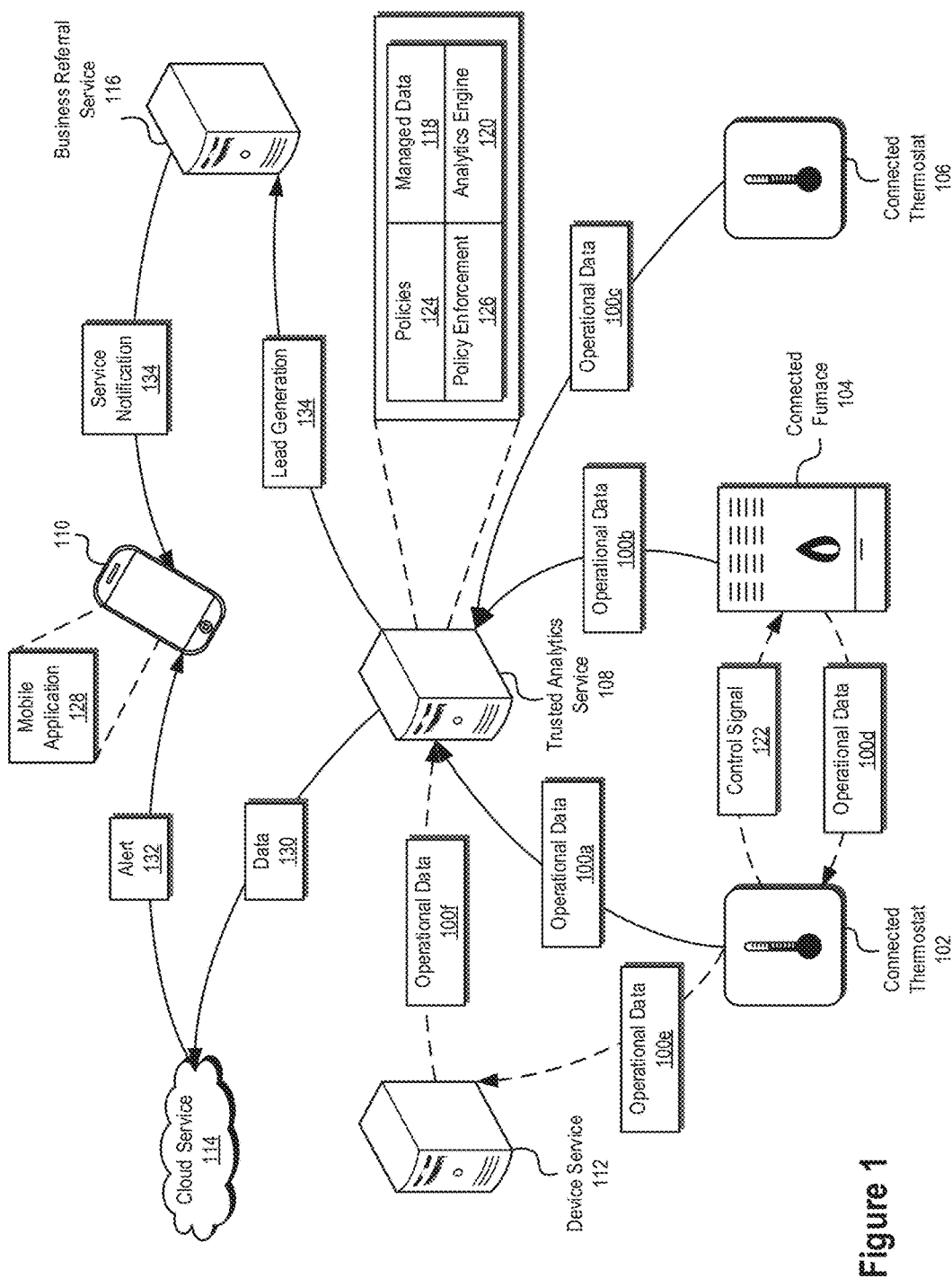
FIG. 1 illustrates generation, communication, and management of operational data consistent with embodiments of the present disclosure.

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Systems and methods disclosed herein facilitate collection and analysis of various operational data generated by one or more connected systems and devices. Operational data, as used herein, may comprise any data associated with the one or more connected systems and/or devices, and may relate to the maintenance, control, management, and/or operation of the systems and/or devices. It will be appreciated that a wide variety of types of operational data may be generated and/or otherwise associated with connected systems and/or devices, and that any suitable type of operational data associated with connected systems and/or devices may be used in connection with the various disclosed embodiments.

Analyzing and drawing insights from operational data generated by connected systems and/or devices is becoming increasing valuable as a larger number of connected systems and/or devices are being deployed. Such insights may be used to improve the operation and/or management of such systems and/or devices. For example, certain embodiments disclosed herein allow for analyzing data generated by connected systems and/or device devices to detect and/or predict impending system and device failures and/or suboptimal performance. By detecting and/or predicting anomalous system and device performance, various actions may be taken to improve system and/or device performance and mitigate failure conditions.

The disclosed embodiments may be used in connection with a variety of connected devices, systems, or "things". As used herein, the terms device, connected device, system, and/or thing may, in certain instances, be used interchangeably. Embodiments of the disclosed systems and methods maybe implemented in connection with a diverse ecosystem of connected devices associated with a user, their home, their vehicle, their workplace, and/or the like. For example, embodiments of the disclosed systems and methods may be used in connection with connected devices including security systems, vehicle infotainment systems, streaming media devices, gaming devices, entertainment systems, networked locks, thermostats, heating (e.g., furnaces), ventilating, and air conditioning ("HVAC") systems, irrigation systems, water controls, pumps, heaters, home utility meters, home network gateways, activity sensors, alarms (e.g., fire and/or $CO_2$ alarms), connected home appliances (e.g., refrigerators, washing machines, televisions, etc.), connected vehicles, mobile communication devices, computing devices, and/or any other connected device, as well as associated data stores. Embodiments may further be extended for use in connection with other connected devices including medical and/or personal devices such as activity and/or fitness monitoring devices, pacemakers, insulin pumps, blood sugar monitors, and/or the like.

Certain embodiments may be used in connection with systems and devices used in industrial applications. For example, consistent with embodiments disclosed herein, connected systems may be included in and/or otherwise associated with wind turbine systems, solar panels, industrial manufacturing systems, tools, and/or devices, and/or the like.

Various examples of the embodiments disclosed herein are described in connection with connected thermostats, furnaces, and wind turbine systems. It will be appreciated, however, that a variety of other connected systems and devices may be used in connection with the disclosed systems and methods, and that any suitable type of connected system and/or device may be used in connection with the various disclosed embodiments.

FIG. 1 illustrates generation, communication, and management of operational data $100a$-$100f$ consistent with embodiments of the present disclosure. As illustrated, one or more connected devices 102-106 may be communicatively coupled with a trusted analytics service 108. The one or more connected devices 102-106 may be configured to communicate operational data $100a$-$100c$ generated by and/or otherwise associated with the connected devices 102-106. As illustrated, the connected devices 102-106 may comprise connected thermostats 102, 106 and a connected furnace 104.

Operational data $100a$-$100f$ may include any data generated by and/or otherwise associated with the connected devices 102-106. For example, the operational data $100a$-$100f$ may comprise, without limitation, various signals including heating, cooling, and/or fan duty cycles as well as user interaction events and/or controls such as control commands, remotely-issued control commands (e.g., commands issued from a smartphone 110), set points, internal temperatures, external temperatures, humidity, and/or the like. Operational data $100a$-$100f$ may be used to, among other things, analyze, determine, and/or predict causes of device failures and/or anomalous device behaviors.

In certain embodiments, operational data $100a$-$100f$ may include information obtained from one or more sensors associated with one or more connected devices 102-106 that may include, without limitation, temperature sensors, current sensors, voltage sensors, humidity sensors, fluid level sensors, atmospheric sensors, environmental sensors, and/or the like.

In some embodiments, certain operational data $100a$-$100c$ may be provided to the trusted analytics service 108 directly from associated connected devices 102-106. In further embodiments, certain operational data $100e$ may be transmitted to one or more intermediate systems before transmission to the trusted analytics service 108. For example, as illustrated, a connected device such as thermostat 102 may communicate with an associated device system 112 configured to facilitate certain device monitoring and control operations. The thermostat 102 may generate and transmit operational data $100e$ to the device service 112, which may in turn transmit operational data $100f$ to the trusted analytics service 108 that may comprise the operational data $100e$ received from the thermostat 102 as well as other data generated by the data service 112.

In further embodiments, the operational data $100a$-$100f$ may be generated and/or provided by one or more one or more data service providers in communication with the trusted analytics service 108. For example, operational data $100a$-$100f$ may be provided by one or more utility providers associated with the connected devices 102-106 (e.g., a gas and/or electric utility and/or the like). In certain embodiments, the data service provider may be associated with a third-party data service (e.g., a weather data service, a planetary information data service, etc.).

In some embodiments, the one or more data service providers may provide operational data that may not necessarily be directly associated with the connected devices 102-106, but may be relevant for use in connection with decisions and/or analyses relating to their operation. For example, in some embodiments, the data service providers may provide historic, current, and/or forecasted environmental and/or weather data (e.g., local and/or global weather data), maintenance log data, and/or the like.

As illustrated, the trusted analytics service 108 may be further communicatively coupled with the device service 112, one or more cloud services 114, and/or one or more additional service providers such as, for example, a business referral service 116. Among other things, the device service 112, one or more cloud services 114, and/or one or more additional service providers may provide the trusted analytics service 108 with information for use in connection with its various operations and analytic methods, and may receive information from the trusted analytics service 108 for use in connection with their various operations. Various interactions between the connected devices 102-106, the trusted analytics service 108, the device service 112, the cloud services 114, and or one or more additional services providers including the business referral service 116 may be managed according to one or more articulated policies 124 enforced by the trusted analytics service 108, as discussed in more detail below.

The connected devices 102-106, the trusted analytics service 108, the user device 110, the device service 112, the cloud services 114, and or one or more additional services providers including the business referral service 116 may comprise a variety of computing devices and/or systems, including any computing system or systems suitable to implement the systems and methods disclosed herein. For example, the connected devices 102-106, the trusted analytics service 108, the device service 112, the cloud services 114, and or one or more additional services providers including the business referral service 116 may comprise a variety of computing devices and systems, including laptop computer systems, desktop computer systems, server computer systems, distributed computer systems, smartphones, tablets, and/or the like. The connected devices 102-106 may further comprise any of the types of device disclosed herein. It will be appreciated that any suitable configuration of computing systems and storage media could be used in connection with the systems including, without limitation, a single server or cluster of servers, or a distributed collection of heterogeneous computer systems connected by a variety of networks (e.g., such as the Internet, public and/or private networks, and/or the like).

In certain embodiments, the various devices and/or systems 102-116 may comprise at least one processor system configured to execute instructions stored on an associated non-transitory computer-readable storage medium. As discussed in more detail below, the various systems may further comprise a secure processing unit ("SPU") configured to perform sensitive operations such as trusted credential and/or key management, secure policy management and/or enforcement, and/or other aspects of the systems and methods disclosed herein. The devices and/or systems 102-116 may further comprise software and/or hardware configured to enable electronic communication of information between the devices and/or systems 102-116 via one or more networks (e.g., network) using any suitable communication technology and/or standard.

In certain embodiments, the various devices and/or systems 102-116 may be communicatively coupled via one or more network connections (e.g., network connections of a network). The network connection(s) may comprise a variety of network communication devices and/or channels and may utilize any suitable communication protocols and/or standards facilitating communication between the various systems. The network connections may comprise the Internet, a local area network, a virtual private network, and/or any other communication network utilizing one or more electronic communication technologies and/or standards (e.g., Ethernet or the like). In some embodiments, the network may comprise a wireless carrier system, such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Speciale Mobile ("GSM"), frequency division multiple access ("FDMA"), and/or time divisional multiple access ("TDMA") standards. In certain embodiments, the network connections may incorporate one or more satellite communication links. In yet further embodiments, the network connections utilize IEEE's 802.11 standards, Bluetooth®, ultra-wide band ("UWB"), Zigbee®, and/or any other suitable standard or standards.

In the various illustrated embodiments, a secure data connection may be established between the connected devices 102-106 and the trusted analytics service 108. Various operational data 100a-100c may be communicated from the connected devices 102-106 to the trusted analytics service 108. For example, a thermostat 102 may communicate user input information (e.g., control inputs issued to the thermostat 102 directly and/or via a mobile device associated with a user 110), heating and/or cooling temperature set points, internal and/or external temperatures, humidity data, heating and/or cooling duty cycles and/or status, and/or the like to the trusted analytics service 108.

In some embodiments, operational data 100a-100c may be collected by the connected devices 102-106 using one or more trusted components executing on the connected devices 102-106. In some embodiments, the trusted components may be installed on the connected devices 102-106 at a time of manufacture. In further embodiments, the trusted components may be installed on the connected devices 102-106 at the direction of an associated user. Among other things, the trusted components may be configured to establish a secure connection between the connected devices 102-106 and the trusted analytics service 108 for communication of the operational data 100a-100c.

Operational data 100a-100f received by the trusted analytics service 108 may be included in a database of operational data 118 managed by the trusted analytics service 108. Using the managed operational data 118, various derived data may be generated in connection with analytical methods implemented by an analytics engine 120 executing on the trusted analytics service 108. For example, duty cycle patterns may be computed based on the operational data 118 indicative of heating and/or cooling efficiency of an HVAC system such as thermostat 102 and a coupled furnace system 104 configured to receive various control instructions 122 from the thermostat 102. In another example, machine learning techniques may be applied in connection with managed operational data 118 for a number of devices in a population of devices (e.g., a plurality of thermostats 102, furnace systems 104, and/or other HVAC systems) to identify anomalous behavior of particular devices in the population.

Anomalous systems can be identified by finding points that, using various geometric and/or look-alike analysis methods, appear different by at least a threshold amount from the systems that function normally. Certain available sensor data may be reviewed (e.g., reviewed by data analysis experts) and labeled as normal for portions of the data exhibiting normal device behavior. Other data exhibiting known anomalies may be similarly labeled and/or labeled with associated status codes (e.g., codes used in maintenance, repair, and/or alarm logs).

In some embodiments, an anonymous data determination algorithm may define a "perimeter" around various examples of data points associated with known normal and/or anomalous behaviors. The boundaries defined by this algorithm may be used to determine whether a data point is associated with anomalous or normal/non-anomalous behavior. Various embodiments disclosed herein may further provide for identification of a type of anomaly (e.g., repair, critical failure, false alarm, etc.) and allow for forecasting of anomalistic behavior (e.g., past and/or real-time anomalies).

In some embodiments, techniques such as t-distributed stochastic neighbor embedding ("t-SNE") may be used to identify anomalous device behavior, which can group devices whose performance as measured by associated data points (e.g., derived data points) are similar, or which can establish a geometry whereby similarly behaving systems are grouped in relatively close proximity. For example, thermostat 102 and/or furnace systems 104 having performance measured by associated operational data 100a, 110b may be grouped with other similarly behaving systems, thereby facilitating identification of anomalous device behavior. In further embodiments, other techniques may be used to model and/or characterize normal device behavior and identify of anomalous device behavior including, without limitation, one or more of principal component analysis ("PCA"), singular value decomposition ("SVD"), matrix factorization for latent feature detection, auto encoding, Like2Vec-style embedding, and/or the like.

In certain embodiments, the analysis of managed data 118 may begin by identifying anomalous data points and/or systems. For example, the managed data 118 may be analyzed to determine which data points deviate from normal parameters. In some embodiments, this analysis may use algorithmic techniques, such as statistical outlier detection modules, support vector machine ("SVM") models, bootstrap models, various other data analysis techniques disclosed herein, and/or any combination of the same.

Figure 2:
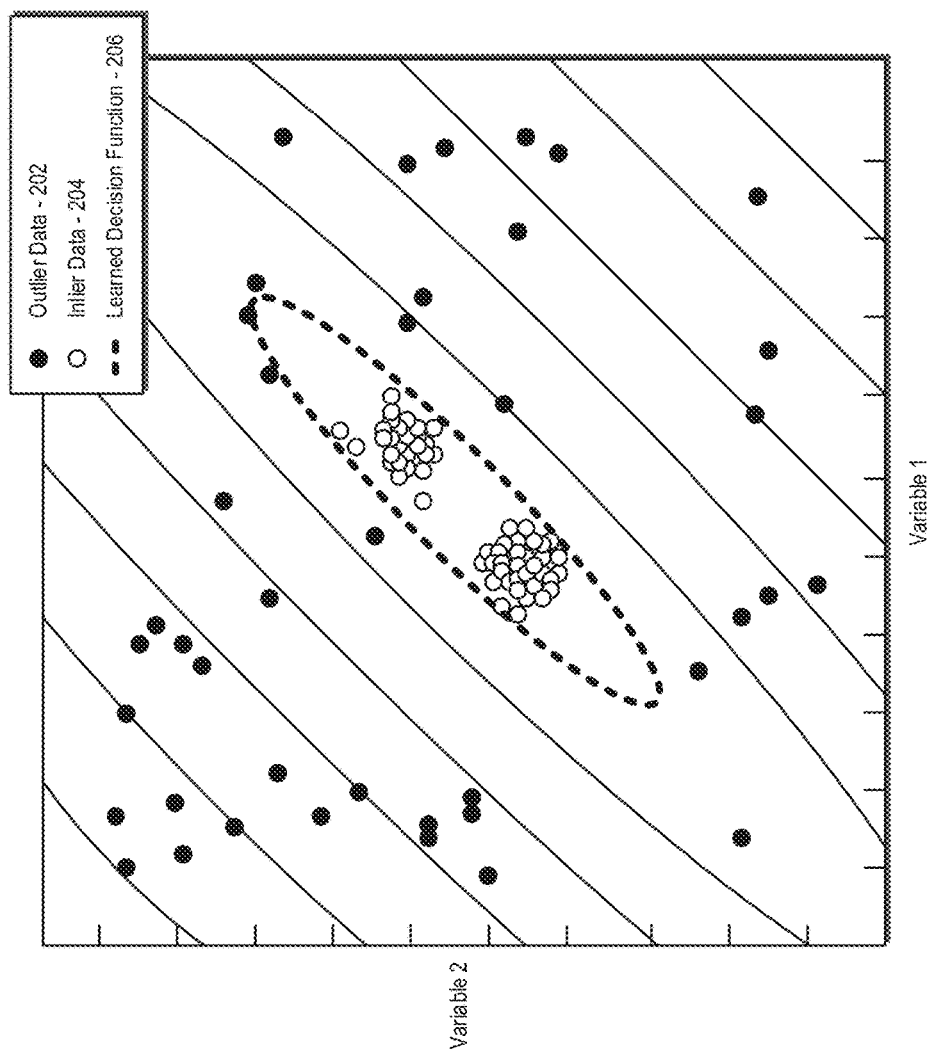
FIG. 2 illustrates anomaly detection modeling consistent with embodiments of the present disclosure.

FIG. 2 illustrates an example of anomaly detection modeling consistent with embodiments of the present disclosure. As shown, various embodiments disclosed herein may be used to generate a decision function 200 used to identify anomalous or outlier data points 202 and, by extension, associated devices exhibiting anomalous behaviors. As illustrated, anomalous systems can be identified by finding associated points 202 that, using various geometric, lookalike, and/or other disclosed analysis methods, appear different by at least a threshold amount from data points 204 associated with other systems that appear to be behaving normally. Based on the relative location of data points 202, 204 and the generated decision function 200, it may be determined whether the data points 202, 204 are associated with normal and/or anomalous device behavior.

After identifying anomalous data points and/or devices, the identified data points and/or systems may be classified. In some embodiments, for each anomalous device that is identified, data associated with other anomalous devices having similar characteristics and/or characteristics within a threshold level of similarity, and having known anomalies, causes for suboptimal performances, known faults, and/or the like may be identified. Based on their similarity, the known anomalies, causes for suboptimal performances, and/or known faults may be associated with the identified anomalous data points and/or device. For example, in various illustrated examples, for each anomalous device that is identified, the data of the entire population of devices can be searched to identify devices with similar characteristics having known failure and suboptimal performance modes and/or which have failed after exhibiting such characteristics.

In some embodiments, anomaly classification based devices and/or data associated with known anomaly types may utilize, for example, one or more of multi-class classification machine learning algorithms (e.g., using a model selected based on a volume of data and an out-of-sample performance) such as k-nearest neighbors, multi-class logistic regression, neural networks, random forest, and/or the like. In certain embodiments, if a plurality of failures, anomalies, and/or suboptimal performance modes are identified, voting or other analytic techniques may be used to identify more likely failures, anomalies, and/or suboptimal performance modes. For example, in connection with identifying a failure, anomaly, and/or suboptimal performance mode, diachronic time-series modeling may be used, where the presence of anomaly types at time T-n, where n is a number of time steps earlier than T, can be used as features in predicting the probability of failure or performance loss for time T.

Referring back to FIG. 1, various data and/or results generated by the trusted analytics service 108 may be communicated to a variety of other devices, systems, and/or services. In some embodiments, indications of identified failures, anomalies, and/or suboptimal performance modes may be communicated to one or more of the associated connected devices 102-106 and/or an associated user device 110 which may alert a user to the identified failures, anomalies, and/or suboptimal performance modes via an associated application 128 executing thereon.

In further embodiments, data and/or results generated by the trusted analytics service 108 may be communicated to other devices, systems, and/or services based on an associated type of identified failure, anomaly, and/or suboptimal performance mode. For example, if a likely dirty furnace filter is identified based on operational data 100b received from the connected furnace 104, an indication of this suboptimal performance mode may be transmitted to an associated commerce service which may order and send a replacement filter to a user.

In another example, a part may be identified as failing in a connected furnace 104 by the trusted analytics service 108. In response, the trusted analytics service 108 may provide a business referral service 116 with lead information 134. In response, the business referral service 116 may schedule a repair technician and/or transmit a notification 134 of repair technician availability to an associated user device 110.

In various other embodiments, various data 130 generated by the trusted analytics service 108 may be provided to a cloud service 114 for use in connection with a variety of other methods and services. For example, in some embodiments, based on data 130 received from the trusted analytics service 108, a cloud service 114 may, among other things, provide recommendations to device manufacturers relating to possible product improvements and/or the like. It will be appreciated that a wide variety of systems and services leveraging the analytics and inference capabilities of the trusted analytics service 108 may be used in connection with the disclosed embodiments.

Various interactions between the systems, services, and/or devices (e.g., connected devices 102-106, the trusted analytics service 108, the user device 110, the device service 112, the cloud services 114, and or one or more additional services providers including the business referral service 116) may be managed according to one or more articulated policies 124 enforced by the trusted analytics service 108. For example, as illustrated, a policy enforcement module 126 executing on the trusted analytics service 108 may, among other things, control how data 118 managed by the trusted analytics service 108 may be communicated and/or used based on applicable associated policies 124.

A variety of policies 124 may enforced by the policy enforcement module 126 of the trusted analytics service 108 in connection with managing operational data 118. In some embodiments, a policy 128 may articulate certain restrictions, conditions, requirements, and/or other actions associated with access to and/or use of operational data 118 managed by the trusted analytics service 108. For example, in some embodiments, operational data 118 managed by the trusted analytics service 108 may or may not be communicated to one or more service systems 114, 116 based on an identity of a requesting service and/or system and/or the type of associated operational data 118.

In certain embodiments, policies 124 may specify one or more operations and/or transformations that should be performed on operational data 118 prior to providing the data to a requesting service 114, 116. In further embodiments, a policy 124 may articulate that certain information be removed from operational data 118 prior to providing the data to a requesting service 114, 116.

Policies 124 enforced by the policy enforcement module 126 may be generated by a variety of interested parties. In some embodiments, policies 114 may be associated with an entity and/or a user associated with devices 102-106 generating operational data 118 managed by the trusted analytics service 108 and/or having ownership, interests in, and/or control of such data 117. For example, a user associated with a connected thermostat 102 may specify that operational data 100a generated by the connected thermostat 102 only be shared with certain specified entities and/or used in a particular manner. Policies 124 may enable owners of data to specify who can access their assets, to set limitations on access to their assets (e.g., time bounded access), and/or the consequences of accessing their assets (e.g., metered access), and/or the like.

In certain embodiments, policies 124 may be transmitted to the trusted service 102 concurrent with associated operational data 100a-100f. For example, a connected furnace 104 may transmit applicable policies 124 when operational data 100b is transmitted to the trusted analytics service 108. In further embodiments, policies 124 may be transmitted to the trusted analytics service 108 separate from associated operational data 100a-100f at any suitable time.

In some embodiments, policies 124 may be role-based (e.g., with users and/or services having certain rights and/or permissions based on one or more defined roles), user-based (e.g., with users and/or services having certain rights and/or permissions based on their individual identities), organization-based (e.g., with users and/or services having certain rights and/or permissions based on membership in one or more organizations), based on a type of associated operational data (e.g., with access being restricted to certain managed operational data 118 deemed proprietary), and/or the like. Policies 124 may articulate, without limitation, policies preventing and/or otherwise restricting access to certain managed operational data 118, policies articulating that certain conditions be met prior to allowing access to certain managed operational data 118 (e.g., purchasing rights associated with the data, registration with a rights holder, demonstrating authorization to access the data, etc.), policies articulating that certain actions be performed in connection with accessing the managed operational data 118 (e.g., notifying a rights holder, etc.), and/or the like. It will be appreciated that a variety of other types of policies may be associated with allowing access to and/or use of managed operational data 118, and that any type of policy articulating any restrictions, conditions, requirements, and/or actions to be enforced in connection with access to and/or use of managed operational data 118 may be utilized in connection with the disclosed embodiments.

In some embodiments, a personal agent executing on one or more connected devices 102-106 and/or associated systems, such as that described in U.S. patent application Ser. No. 12/785,406, filed May 21, 2010, may be used to collect, store, and/or otherwise managed operational data 100a-100f. In certain embodiments, privacy considerations may be maintained because only the personal agent may have direct access to certain confidential information generated by the connected devices 102. Users may have control over what information is exposed from the personal agent to other entities such as the trusted analytics service 108.

A personal agent may be implemented in a variety of ways to collect, store, and/or manage operational data. In some embodiments, a personal agent may be implemented as an agent that runs locally on a connected device 102-106 such as a background service configured to monitor events and collect information from a variety of sources. In further embodiments, a personal agent may be implemented as a network service that interacts with services and collects various information of interest.

In some embodiments, information collection sharing through a personal agent may be controlled to protect a user's privacy. User privacy may be protected in a variety of ways. A personal agent may support interfaces where a system and a user can specify a policy (e.g., a policy 124 enforced by the trusted analytics service 108) defining what operational data can be captured and/or for what purposes the information can be used. For example, in some embodiments, a personal agent may provide users with the capability to opt-out of operational data collection and/or the drawing of certain inferences from collected operational data 118.

Data may be stored and/or managed by a personal agent in a secure manner. For example, a personal agent may utilize encrypted databases to store collected operational data 100a-100f. Moreover, personal agent services running in the cloud may use enterprise service level security to protect operational data 100a-100f. By interfacing with a personal agent associated with their connected devices 102-106 (e.g., using a smartphone 110 and an associated mobile application 128 or the like), a user may view, edit, and/or remove their data from storage and/or collection, agree to share their data and provide conditions associated with such sharing, view what data they are sharing, identify with whom they are sharing it, and see what value they are provided in exchange, and/or the like.

It will be appreciated that a number of variations can be made to the architecture and relationships presented in connection with FIG. 1 within the scope of the inventive body of work. For example, without limitation, in some embodiments, some or all of the functions performed by the connected devices 102-106, the trusted analytics service 108, the device service 112, the cloud services 114, and or one or more additional services providers including the business referral service 116 may be performed by a single system and/or any suitable combination of systems. Furthermore, in some embodiments, operational data 100a-100f may not necessarily be provided by the illustrated connected devices 102-106 but some other type of monitored system or systems (e.g., wind turbine systems and/or the like). Thus it will be appreciated that FIG. 1 is provided for purposes of illustration and explanation, and not limitation.

Figure 3:
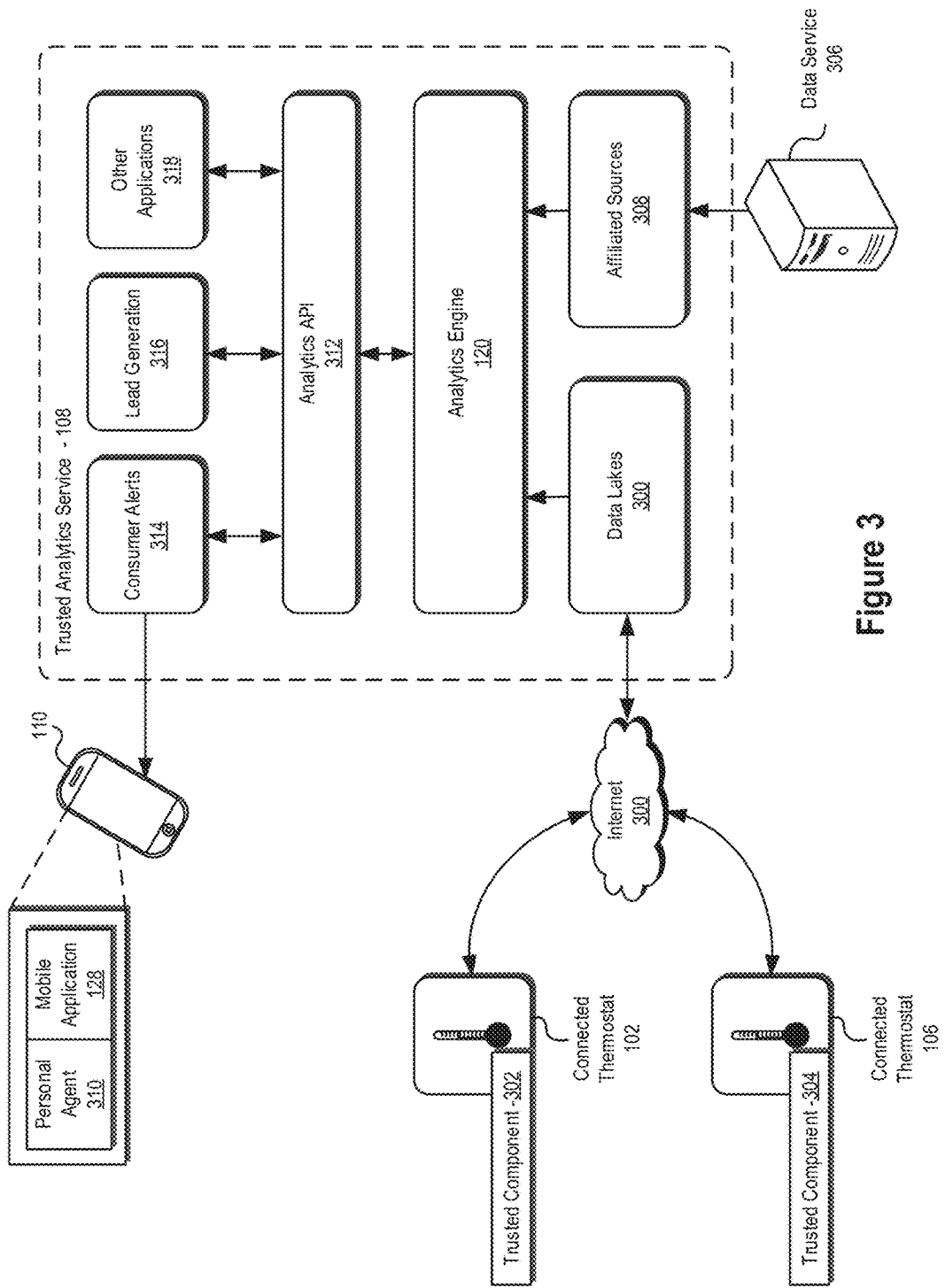
FIG. 3 illustrates an architecture for analyzing and managing operational data consistent with embodiments disclosed herein.

FIG. 3 illustrates an example of an architecture for analyzing and managing operational data consistent with embodiments disclosed herein. In certain embodiments, various aspects of the illustrated architecture may be associated with one or more connected devices such as connected thermostat 102, 106, a data service 308, a trusted analytics service 108, and/or a user device such as smartphone 110.

In some embodiments, operational data may be collected by the connected devices 102, 106 using one or more trusted components 302, 304 executing on the connected devices 102, 106. The trusted components 302, 304 may, among other things, be configured to securely collected associated operational data and securely communicate collected data between the connected devices 102, 106 and the trusted analytics service 108 via an internet connection 300.

Received operational data may be stored in one or more data lakes 306 associated with the trusted analytics service. In some embodiments, the data lakes 306 may store raw operational data in its native format and/or in a flat architecture until it is processed and/or otherwise analyzed by the trusted analytics service 108. In further embodiments, a data service provider 306 may provide the trusted analytics service 108 with various data (e.g., weather data and/or the like) that may be stored in the data lakes 306 with the managed operational data and/or in a separate store 308 associated with data received from affiliated data services.

An analytics engine 120 may be configured to perform various analytics on and/or draw inferences from data included in the data lakes 306 and/or associated affiliated data store 308. In certain embodiments, interactions with and/or operations performed on the data may be in accordance with one or more articulated policies. In certain embodiments, such policies may be articulated and/or managed by a personal agent 310 executing on a device 110 of a user associated with the connected devices 102, 106.

Various applications 314-318 may interact with the analytics engine 120 via an analytics API 312. For example, the applications 314-318 may issue one or more requests to the analytics engine 120 and receive responses to such requests via the analytics API 312. In some embodiments, the applications 314-318 may be associated with and/or otherwise executed by the trusted analytics service 108. In further embodiments, the applications 314-318 may be executed by and/or otherwise associated with one or more separate systems and/or services.

A wide variety of applications 314-318 may be used in connection with the disclosed embodiments. For example, an application 314 may be configured to provide consumer alerts (e.g., via notifications issued via a mobile application 128 executing on a user's smartphone 110 or the like) relating to failures, faults, and/or suboptimal performance of a user's associated connected devices 102, 106 identified based on associated operational data. An application 316 may provide a business referral service configured to schedule a repair technician and/or transmit a notification of repair technician availability to an associated user device 110. A variety of other applications 318 may be utilized in connection with the disclosed embodiments to provide a variety of other services that leverage analytical results provided by the trusted analytics service 108.

Various embodiments disclosed herein may be further used in connection with one or more connected wind turbine systems to manage and/or improve the operation of the wind turbines systems. Among other things, embodiments of the disclosed systems and methods may help wind turbine operators to maximize production and minimize costs associated with wind farm operations and/or may optimize the use of original equipment manufacturer warranties. Some embodiments herein allow for centralized storage and/or management of wind farm data, correlation of operational data obtained from multiple sources, and/or provide for a consolidated view of the health of a wind farm. Access to industry wide data sets may enable the development of accurate anomaly detection algorithms and improved insights into wind turbine system component performance and durability.

Figure 4:
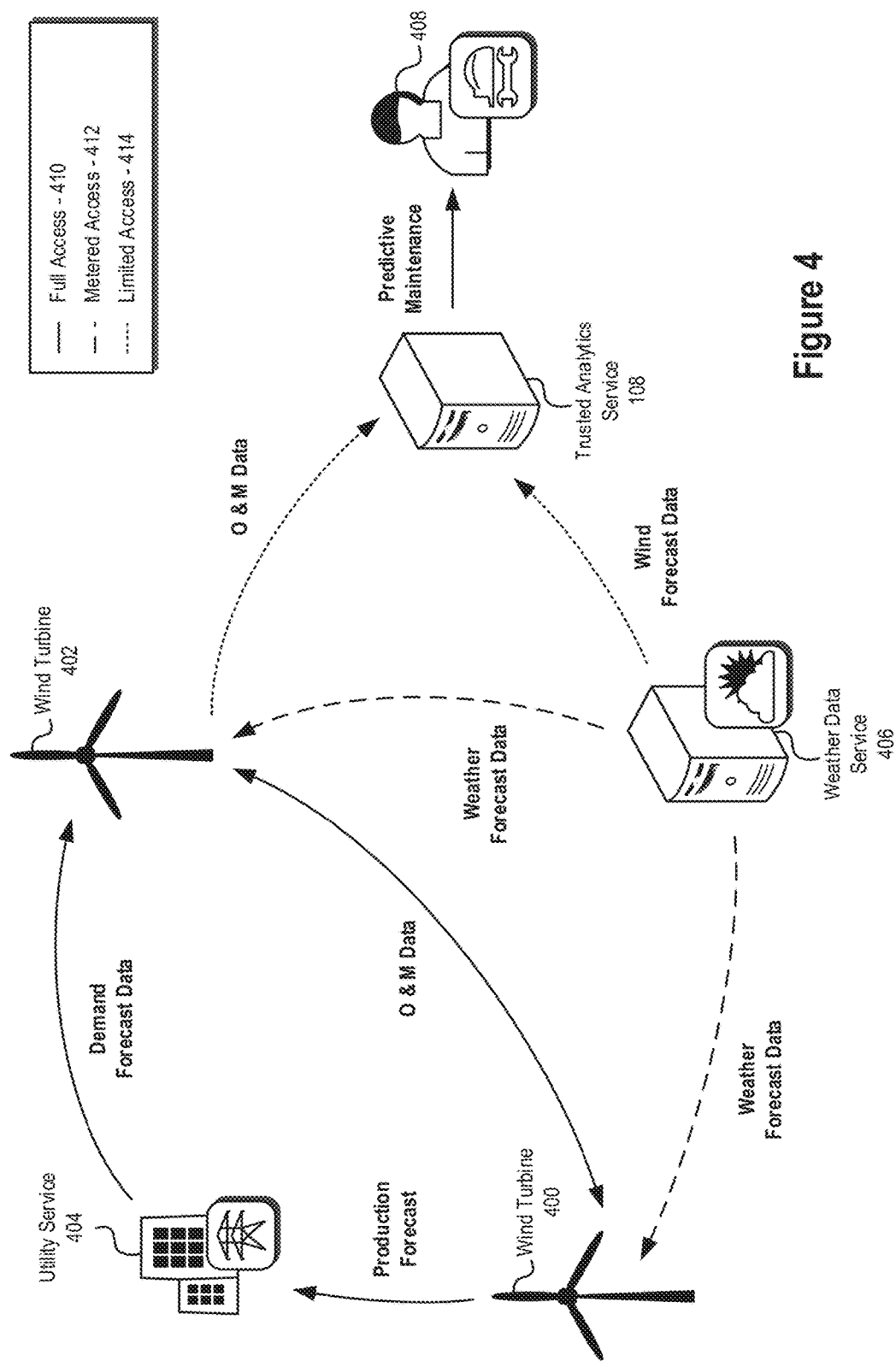
FIG. 4 illustrates an ecosystem for analyzing and levering operational data associated with wind turbine systems consistent with embodiments disclosed herein.

FIG. 4 illustrates an exemplary ecosystem for analyzing and levering operational data associated with one or more wind turbine systems 400, 402 consistent with embodiments disclosed herein. As illustrated, the ecosystem may include one or more wind turbine system 400, 402, a utility service 404, one or more data service providers such as a weather data service 406, a trusted analytics service 108, and/or one or more systems and/or devices associated with a user such as a maintenance technician 408 that may be communicatively coupled and configured to exchange various information therebetween.

In some embodiments, certain interactions between the one or more wind turbine systems 400, 402, the utility service 404, the weather data service 406, the trusted analytics service 108, and/or one or more systems and/or devices associated with a user may be managed according to one more articulated policies. For example, the exchange of various information between the systems and/or services 108, 400-406 may be managed according to one or more articulated policies.

In some embodiments, policies governing various interactions between the systems and/or services 108, 400-406 may be enforced may one or more trusted components, personal agents, and/or policy enforcement modules executing on the one or more systems and/or services 108, 400-406. In further embodiments, policies may be centrally enforced by a policy enforcement module executing on the trusted analytics service 108.

Consistent with applicable enforced polices, data may be exchanged between the systems and/or services 108, 400-406 in accordance with varied access permissions 410-412 associated with the exchanged data. For example, the wind turbine system 400 may provide production forecast data to the utility service 404, the utility service 404 may provide power demand forecast data to the wind turbine system 402, the wind turbines 400, 402 may exchange operations and maintenance ("O & M") data, and the trusted analytics service 108 may provide a device associated with a repair technician 408 with predictive maintenance data without limiting access to the associated exchanged data—that is, in accordance with a policy allowing full access 410 to the underlying data. Similarly, the weather data service 406 may provide forecast data to the wind turbine systems 400 in accordance with a policy allowing metered access 412 to the data. Finally, the weather data service 406 may provide the trusted analytics service 108 with wind forecast data, and the wind turbine system 402 may provide the trusted analytics service 108 with O & M data in accordance with a policy allowing limited access 414 to such data. It will be appreciated that the various interactions illustrated in FIG. 4 are examples of how policy may be implemented and/or enforced between various systems and/or services 108, 400-406, and that policies may be enforced consistent with various disclosed embodiments in other suitable system and/or service ecosystems exchanging any suitable type of data.

Figure 5:
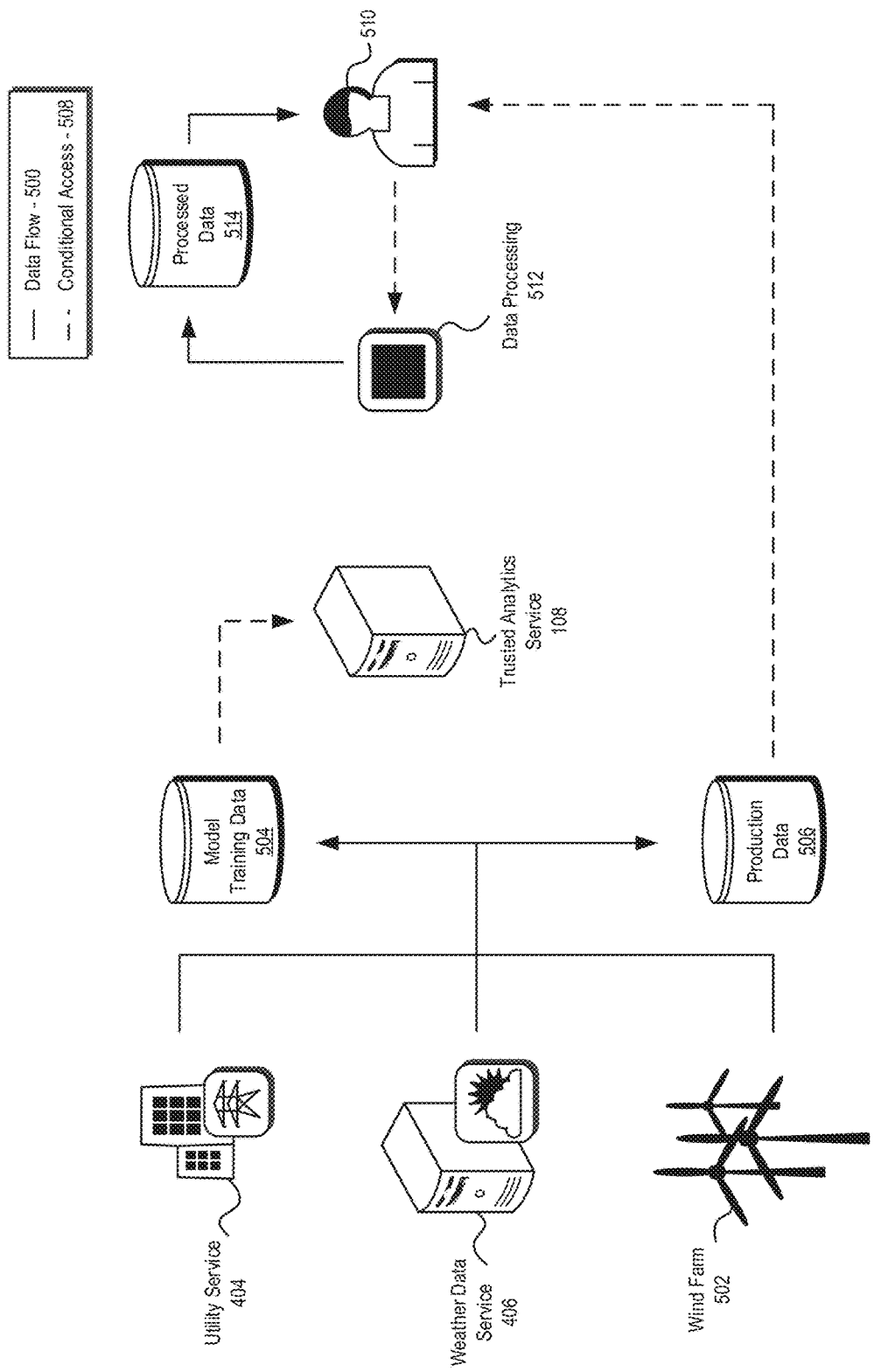
FIG. 5 illustrates exemplary dataflow between various systems and services consistent with embodiments disclosed herein.

FIG. 5 illustrates exemplary dataflow 500 between various systems and services 404, 406, 502, 108, 510, 512 consistent with embodiments disclosed herein. As illustrated, various operational data and/or other data (e.g., weather data, power demand forecast data, etc.) may be generated and/or otherwise provided by a utility service 404, a weather data service 406, and/or one or more wind turbines of a wind farm 502. The generated operational and/or other data may be stored in one or more data stores 504, 506 including, for example, a model training data store 504 storing data used in connection with training various predictive models consistent with the disclosed embodiments (e.g., fault and/or anomaly detection models and or the like). In further embodiments, the operational and/or other data may be stored in a production data store 506 for distribution to one or more other interested parties 510.

In some embodiments, access to data stored in data stores 504, 506 may governed in accordance with one or more policies enforcing conditional access 508 to the stored data. For example, the trusted analytics service 108 may conditionally access data stored in the model training data store 504 in accordance with applicable policy. Similarly, an interested party may conditionally access data stored in the production data store 506 in accordance with applicable policy. In some embodiments, use of the access data by the party 510 (e.g., processing by various data processing modules/systems 512 and/or storage of processed and/or otherwise derived data in a data store 514) may be further governed in accordance with applicable policy.

Embodiments disclosed herein may provide for governed analytics services based on industry wide data sets. In some embodiments, data sets may be anonymized and normalized in a governed manner. As discussed in more detail below, applications and/or widgets may provide users with insights into the health of a wind farm and/or its constituent wind turbine systems. Various aspects of the disclosed services may be subscription-based (e.g., based on volume and/or density of analyzed data, based on data access rates, volume, and/or density of accessed data), commerce-based through the sale of applications, and/or based on revenue sharing models with associated data publishers/generators.

FIG. 6-9 illustrate exemplary interactive interfaces 600, 602, 700, 800-804, 900, 902 of a trusted analytics service consistent with embodiments disclosed herein. In some embodiments, the exemplary interfaces 600, 602, 700, 800-804, 900, 902 may comprise interfaces of an application executing on a user system interacting with a trusted analytics service consistent with embodiments disclosed herein. In certain embodiments, the interfaces 600, 602, 700, 800-804, 900, 902 may comprise HTML5-based interfaces displayed, for example, in a web-browser application. In further embodiments, the interfaces 600, 602, 700, 800-804, 900, 902 may be mobile device interfaces, computer system application interfaces (e.g., desktop application interfaces), and/or any other type of interface. Certain embodiments illustrated in FIG. 6-9 show interfaces 600, 602, 700, 800-804, 900, 902 of a trusted analytics service for interacting with operational data and/or other data associated with a wind farm system comprising a plurality of wind turbine systems, although it will be appreciated that aspects of the illustrated interfaces 600, 602, 700, 800-804, 900, 902 may be used in a variety of other contexts.

Various aspects of the interfaces 600, 602, 700, 800-804, 900, 902 illustrated in FIGS. 6-9 may allow users to interact with various operational and/or other data, analyze the data, draw various insights from the data, and/or engage in various actions based on the data consistent with disclosed embodiments. For example, aspects of the interfaces 600, 602, 700, 800-804, 900, 902 may allow user to analyze operational data generated by one or more connected devices and/or systems and detect and/or predict impending systems and/or device performance. In further embodiments, aspects of the interfaces 600, 602, 700, 800-804, 900, 902 may allow a user to engage in various actions to improve system and device performance and mitigate failure conditions.

Figure 6:
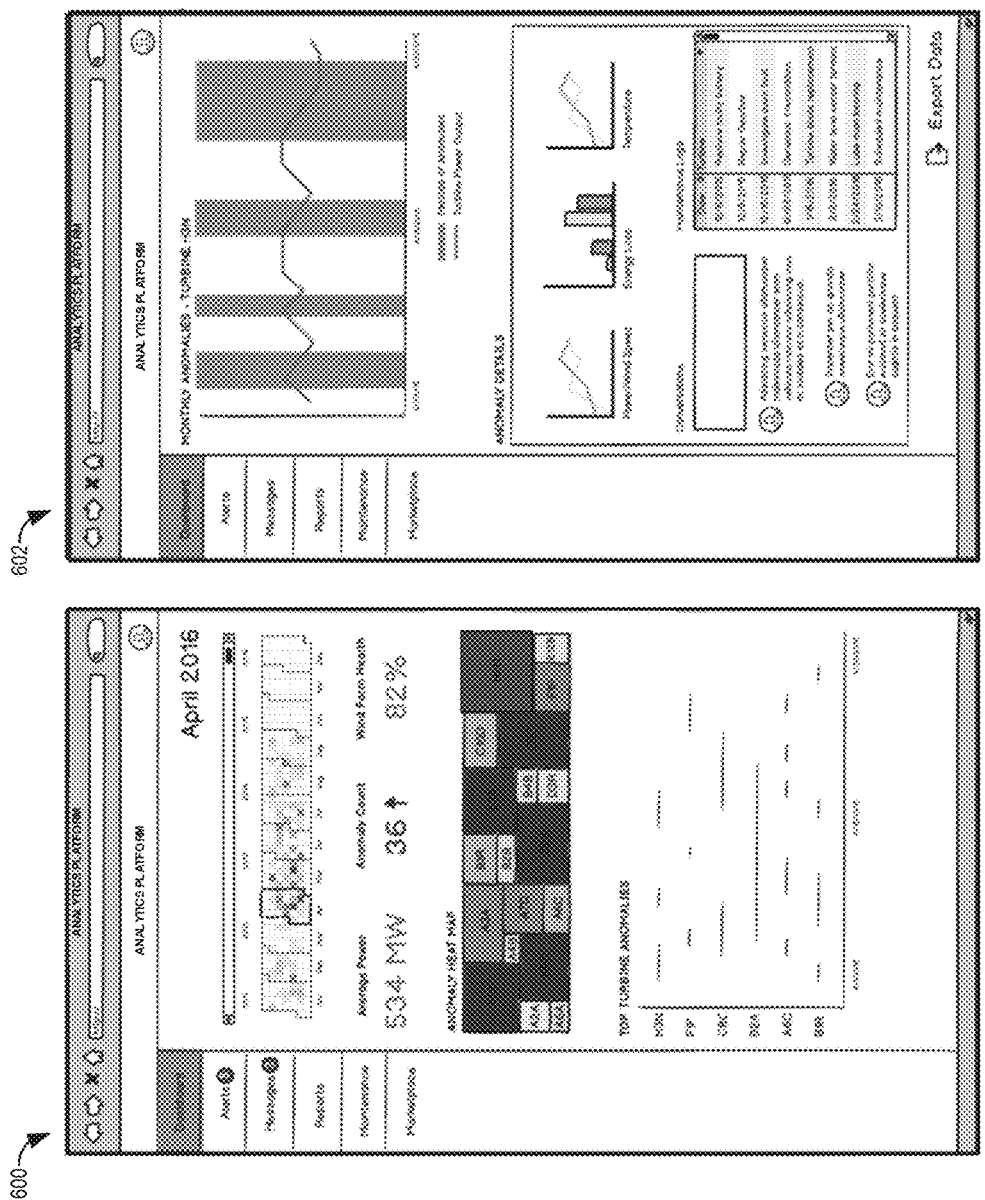
FIG. 6 illustrates exemplary interactive interfaces of a trusted analytics service consistent with embodiments disclosed herein.

As illustrated in FIG. 6, interface 600 may provide a dashboard allowing a user to interact with and/or analyze data from a plurality of wind turbine systems of a wind farm. In some embodiments, operational data associated with the wind turbine systems may be displayed and viewed based on a specified time period. For example, a user may scroll through different dates or use a calendar view to view operational data associated with time periods of interest.

The interface 600 may show a variety of analytics relating to the wind turbine systems for the specified period. For example, a total power output for the systems, a total anomaly and/or fault count for the systems, and a measure of the wind farm's health may be displayed. The interface 600 may further include an anomaly heat map providing a visual indication of wind turbine systems with the most detected anomalies within the specified time period and/or a list showing a number of wind turbine systems exhibiting anomalies within the specified time period.

In some embodiments, users can select a turbine system from the heat map or the list to access a more detailed interface 602 showing available information relating to the turbine system. For example, a monthly anomalies chart may provide details of various anomalies cross-referenced with other sensor and analytic data. In some embodiments, selecting a shaded area on monthly anomalies chart may provide specific turbine details during that time period including, for example, maintenance logs and various sensor data. Using interface 602, users may further communicate and share information, onsite findings, and documents with team members.

Figure 7:
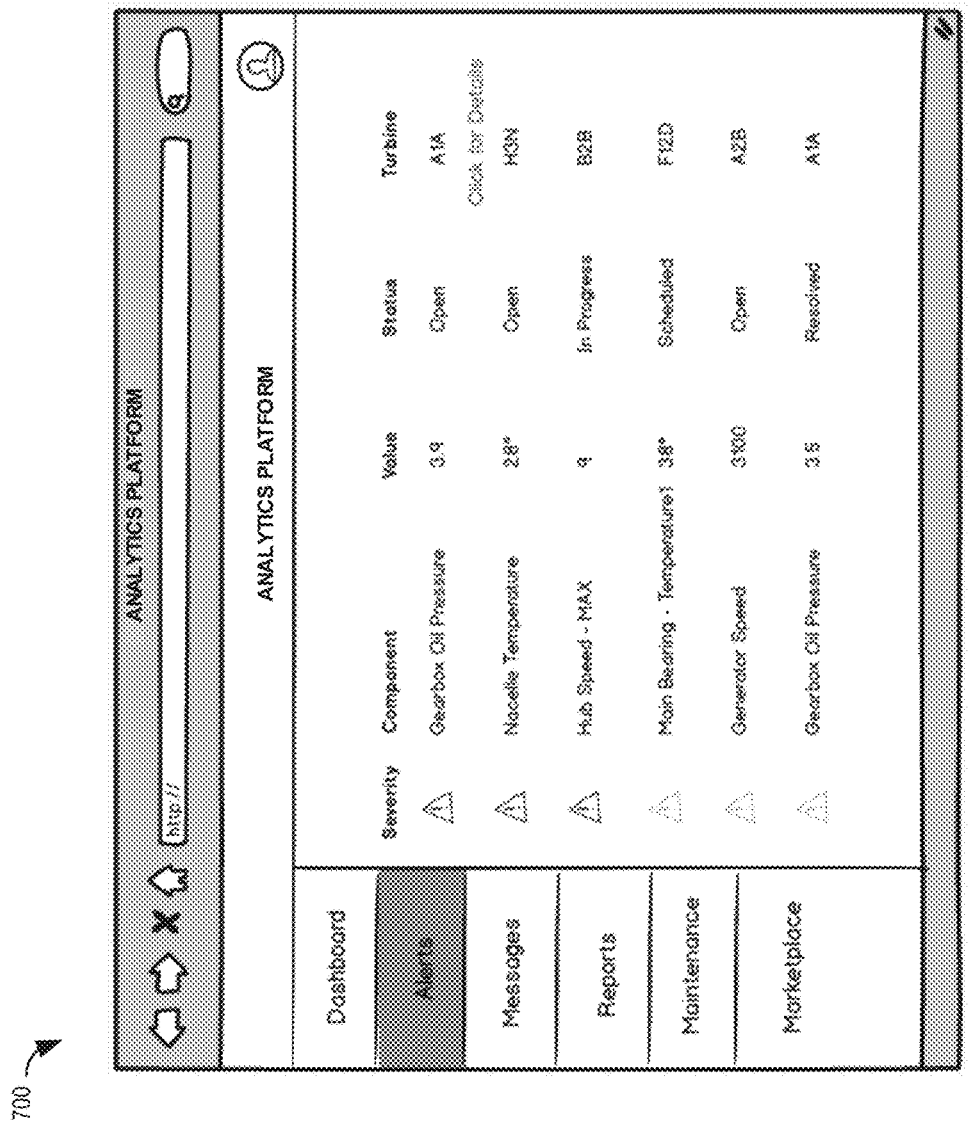
FIG. 7 illustrates a further exemplary interactive interface of a trusted analytics service consistent with embodiments disclosed herein.

Using the interface 700 illustrated in FIG. 7, users may quickly view recent and historic alerts for the wind farm and/or one or more of its constituent wind turbine systems. In some embodiments, selecting an alert in interface 700 may take users to a more detailed view of information relating to an associated turbine, allowing a user to view more specific details and/or logs relating to a particular alert and/or anomaly.

Figure 8:
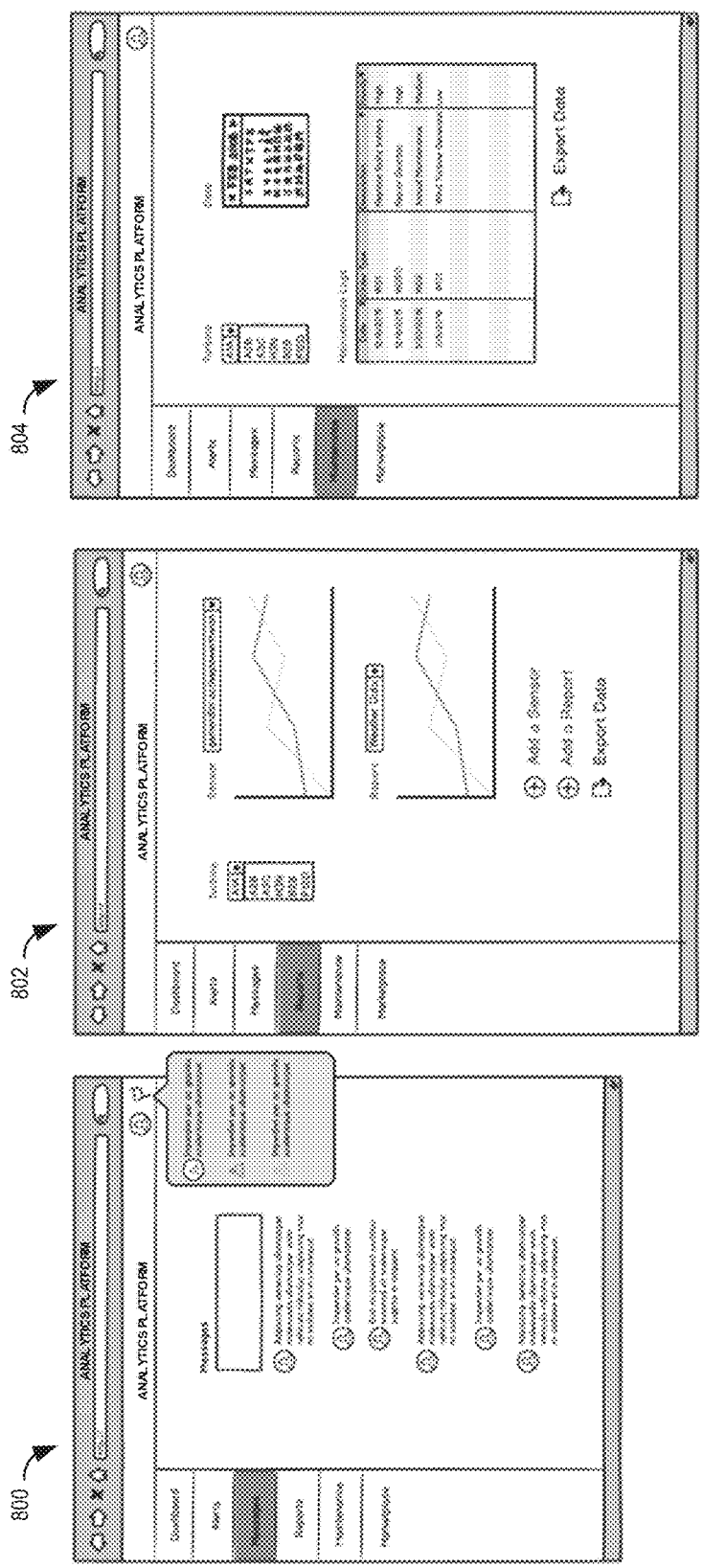
FIG. 8 illustrates yet further exemplary interactive interfaces of a trusted analytics service consistent with embodiments disclosed herein.

FIG. 8 illustrates a variety of exemplary interfaces including an interface 800 for exchanging messages between various parties associated with a wind farm, an interface 802 for generating reports relating to a wind farm, and an interface 804 for interacting with maintenance logs associated with a wind farm. Using interface 800, various parties associated with a wind farm can communicate and share information, onside findings, documents, and/or other information with various team members and/or other parties. In some embodiments, the interface 800 may provide notifications (e.g., real-time notifications) alerting users of new content and/or alerts associated with one or more wind turbine systems. Alerts may be provided via, for example, in app notifications, e-mail alerts, mobile push notifications (e.g., via SMS text message), and/or the like.

Interface 802 may allow a user to generate a variety of reports relating to a wind farm and/or its consistent wind turbine systems. For example, users may generate custom reports based on data provided by one or more sensors associated with one or more specified wind turbine systems and/or group(s) of wind turbine systems. In some embodiments, generated reports and/or associated information and/or data may be exported by a user using interface 802.

Maintenance information relating to one or more wind turbine systems may be provided to a user via interface 804. Using interface 804, a user may access various maintenance logs associated with a specified wind turbine system and/or group(s) of wind turbine systems over a specific date and/or range of dates. Users may be further able to export the maintenance data for external use as desired.

Figure 9:
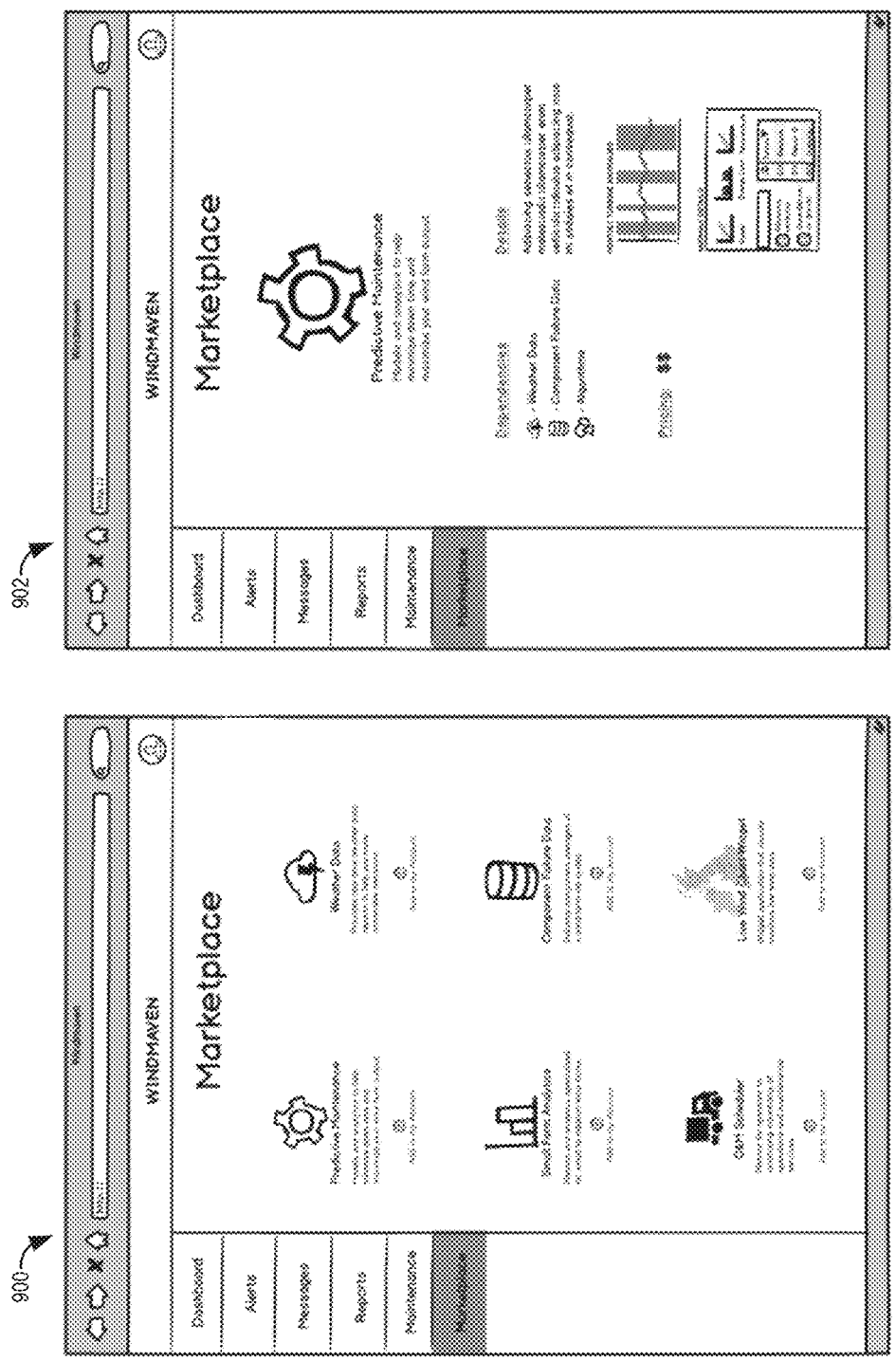
FIG. 9 illustrates additional exemplary interactive interfaces of a trusted analytics service consistent with embodiments disclosed herein.

FIG. 9 illustrates a variety of exemplary interfaces 900, 902 for browsing various application marketplaces for interacting with operational data associated with a windfarm consistent with embodiments disclosed herein. For example, in some embodiments, a trusted analytics service may provide a marketplace where various parties may publish data, applications, algorithms, and/or software widgets. Using interfaces 900, 902, a user may download and/or purchase published data, applications, algorithms, and/or widgets. In some embodiments, a user may view various details relating to available data, applications, algorithms, and/or widgets. For example, as shown in connection with interface 902, a description of an application, a price, various data dependencies, and/or other application details may be provided to a user interested in downloading and/or purchasing an application.

Figure 10:
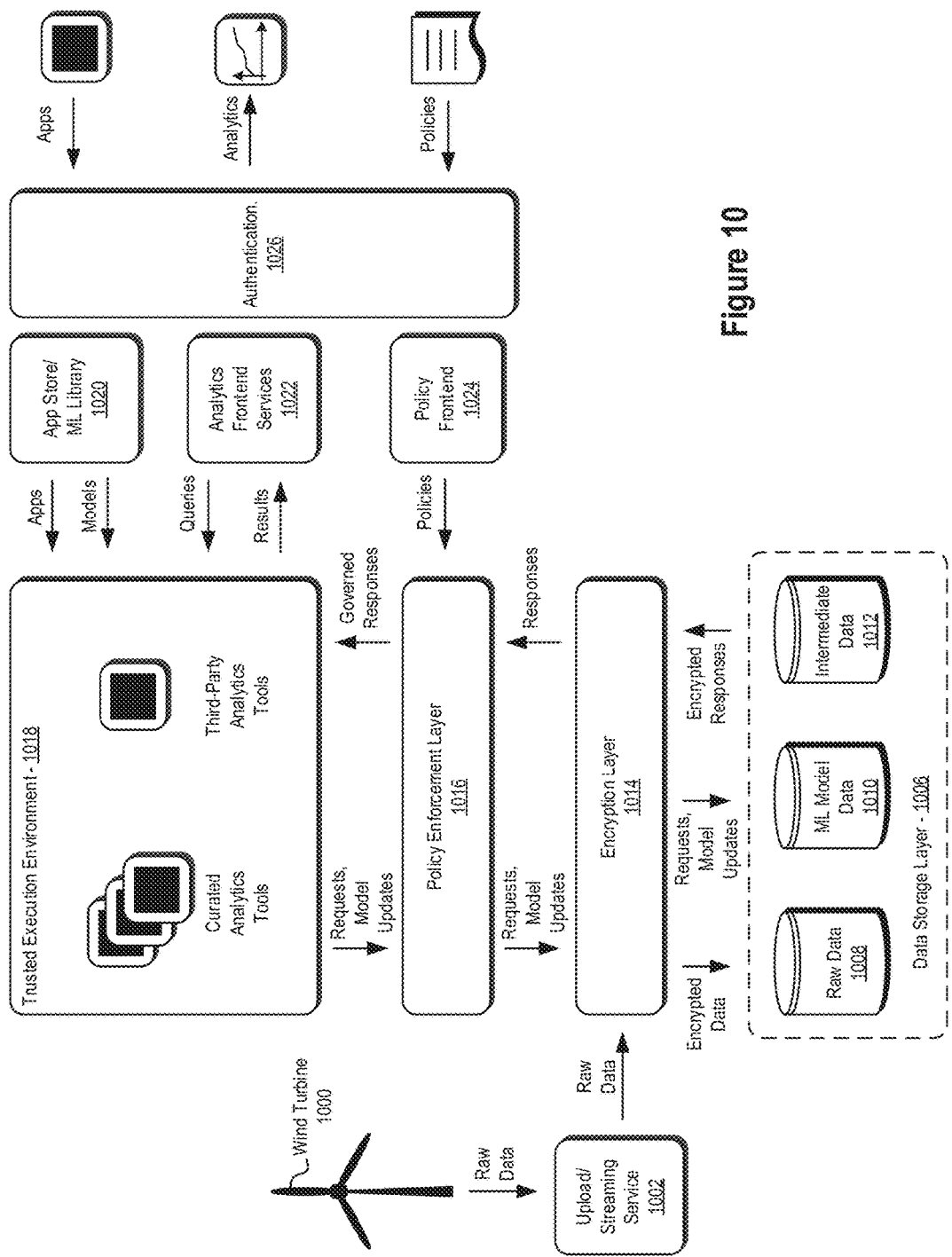
FIG. 10 illustrates another architecture for analyzing and managing operational data consistent with embodiments disclosed herein.

FIG. 10 illustrates another architecture for analyzing and managing operational data consistent with embodiments disclosed herein. In certain embodiments, various aspects of the illustrated architecture may be associated with a connected device such as a wind turbine system 1000, a trusted analytics service, various user systems and/or devices used to interact with the trusted analytics service, and/or any other related devices and/or system.

As illustrated, raw operational data may be collected by a wind turbine system 1000. In some embodiments, a trusted component executing on the wind turbine system 1000 may be configured to securely collect raw operational data and transmit the collected operational data to a data upload and/or streaming service 1002, which in certain embodiments may be associated with a trusted analytics service.

Operational data collected by the data upload and/or streaming service 1002 may be forwarded to an encryption layer 1014 configured to perform encryption and/or decryption operations. For example, as illustrated, the encryption layer 1014 may encrypt data prior to storage in an associated data store (e.g., a raw operational data store 1008, a machine learning model data store 1010, and/or an intermediate data store 1012) of a data storage layer 1006. In some embodiments, data requests and/or model updates may further be encrypted by the encryption layer 1014 prior to being issued to the data storage layer 1006. The encryption layer 1014 may further be configured to decrypt responses to data requests received from the data storage layer 1006.

Data requests, model updates, and/or associated responses may be issued by one or more software modules, applications, and/or tools executing within a trusted execution environment 1018. For example, as illustrated, one or more curated analytics tools, third party analytics tools, and/or the like may be configured to be executed within the trusted execution environment 1018. In some embodiments, the various requests, model updates, and/or associated responses may be managed by a policy enforcement layer 1016 configured to enforce one or more policies received from a policy frontend 1024. In certain embodiments, tools executing in the trusted execution environment 1018 and/or model updates may be downloaded and/or otherwise purchased from an application store and/or machine learning model library 1020.

Queries and/or requests may be issued to the modules, applications, and/or tools within the trusted execution environment 1018 may be issued via various analytics frontend services 1022. In some embodiments, devices and/or systems and/or associated users and/or entities communicating information to and/or receiving information from the application store and/or machine learning model library 1020, analytics frontend services 1022, and/or the policy frontend 1024 may be authenticated via authentication services 1026.

Figure 11:
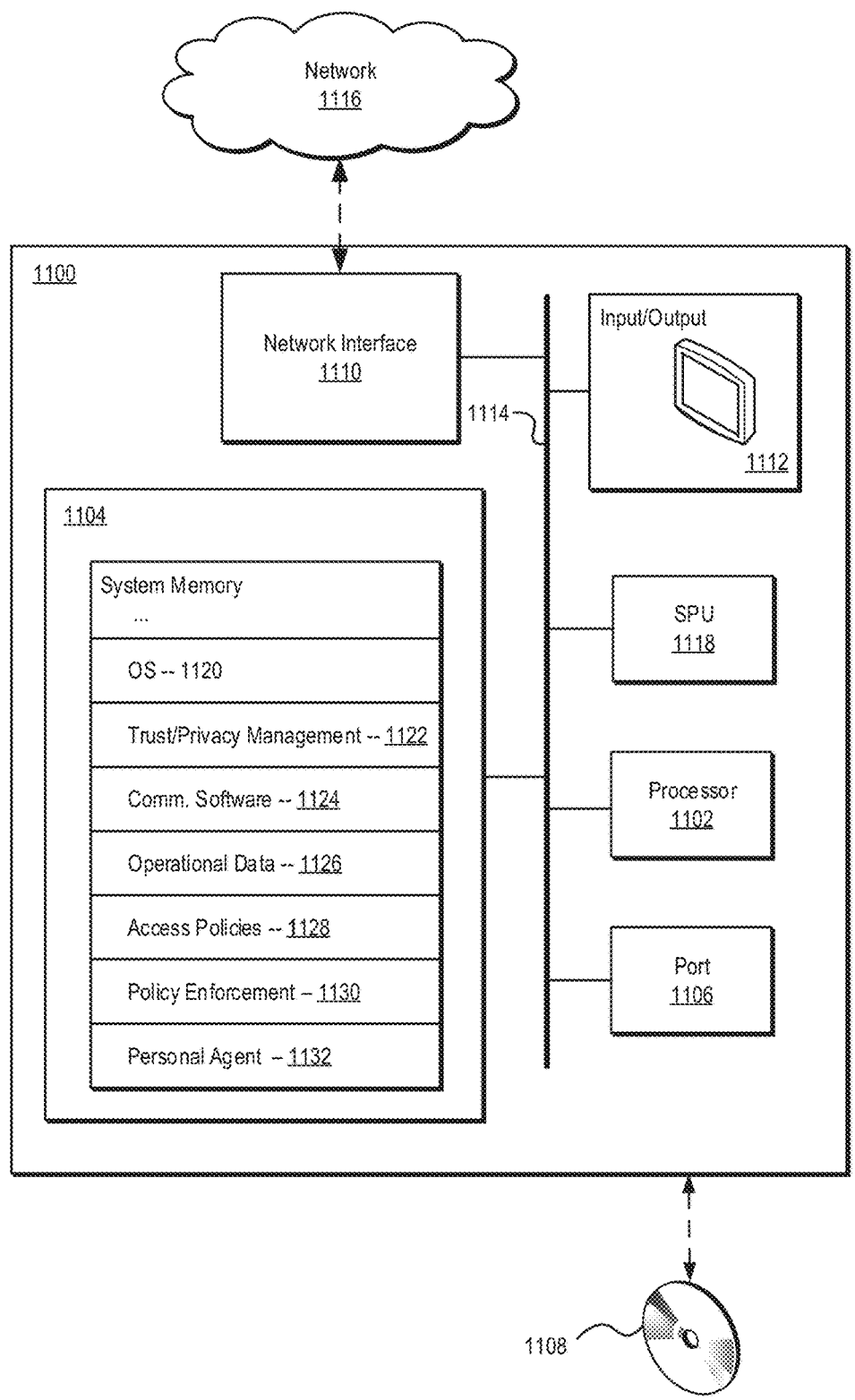
FIG. 11 illustrates an exemplary system that may be used to implement embodiments of the systems and methods of the present disclosure.

FIG. 11 illustrates an exemplary system 1100 that may be used to implement embodiments of the systems and methods of the present disclosure. Certain elements associated with the illustrated exemplary system 1100 may be included in one or more systems configured to store, communicate, and/or otherwise use operational data, and/or any other system configured to implement embodiments of the disclosed systems and methods. For example, various elements included in the illustrated system 1100 may be included in a trusted analytics service configured to analyze operational data associated with one or more connected devices such as one or more connected thermostats and/or wind turbine systems.

As illustrated in FIG. 11, the system 1100 may include: a processing unit 1102; system memory 1104, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 1106 for interfacing with removable memory 1108 that may include one or more diskettes, optical storage mediums, and/or other non-transitory computer-readable storage mediums (e.g., flash memory, thumb drives, USB dongles, compact discs, DVDs, etc.); a network interface 1110 for communicating with other systems via one or more network connections 1116 using one or more communication technologies; a user interface 1112 that may include a display and/or one or more input/output devices such as, for example, a touchscreen, a keyboard, a mouse, a track pad, and the like, and one or more busses 1114 for communicatively coupling the elements of the system 1100.

In some embodiments, the system 1100 may, alternatively or in addition, include an SPU 1118 that is protected from tampering by a user of the system or other entities by utilizing secure physical and/or virtual security techniques. An SPU 1118 can help enhance the security of sensitive operations such as personal information management, trusted credential and/or key management, privacy and policy management, and other aspects of the systems and methods disclosed herein. In certain embodiments, the SPU 1118 may operate in a logically secure processing domain and be configured to protect and operate on secret information, as described herein. In some embodiments, the SPU 1118 may include internal memory storing executable instructions or programs configured to enable the SPU 1118 to perform secure operations, as described herein.

The operation of the system 1100 may be generally controlled by a processing unit 1102 and/or an SPU 1118 operating by executing software instructions and programs stored in the system memory 1104 (and/or other computer-readable media, such as removable memory 1108). The system memory 1104 may store a variety of executable programs or modules for controlling the operation of the system 1100. For example, the system memory 1104 may include an operating system ("OS") 1120 that may manage and coordinate, at least in part, system hardware resources and provide for common services for execution of various applications and a trust and privacy management system 1122 for implementing trust and privacy management functionality including protection and/or management of personal data through management and/or enforcement of associated policies. The system memory 1104 may further include, without limitation, communication software 1124 configured to enable in part communication with and by the system; one or more applications; operational data 1126 and/or related access policies 1128; data management and/or policy enforcement modules 1130 configured to implement various data access control methods disclosed herein; a personal agent module 1132 and/or any other information, modules; and/or any other applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for managing operational data associated with connected devices performed by a trusted service comprising a processor and a non-transitory computer-readable medium storing instructions that, when executed by the processor, cause the trusted service to perform the method, the method comprising:
   receiving first operational data from a plurality of first connected devices, wherein the first operational data comprises an indication of a maintenance status code associated with at least one connected device of the plurality of the first connected devices and wherein the first operational data comprises an indication of at least one known anomalous condition associated with at least one connected device of the plurality of first connected devices;
   receiving second operational data from a second connected device;
   receiving data from a data service provider;
   identifying, based on an analysis of the first operational data and the second operational data, at least one anomalous condition associated with the second connected device, wherein identifying the at least one anomalous condition associated with the second connected device comprises identifying the maintenance status code, and wherein identifying the at least one anomalous condition associated with the second connected device further comprises:
      comparing the first operational data and the second operational data,
      determining, based on the comparison, that the first operational data associated with the at least one connected device of the plurality of first connected devices is within a threshold difference of the second operational data,
      identifying the at least one anomalous condition associated with the second connected device as the at least one known anomalous condition specified in the first operational data, wherein identifying the at least one anomalous condition associated with the second connected device is further based on the data received from the data service provider; and
   generating at least one response based on identifying the at least one anomalous condition associated with the second connected device.

2. The method of claim 1, where the first operational data comprises at least one of device sensor data, device command information, duty cycle information, and device set point information.

3. The method of claim 2, wherein the device sensor data comprises at least one of data provided by an internal temperature sensor, an external temperature sensor, a humidity sensor, a current sensor, a voltage sensor, a fluid level sensor, an atmospheric sensor, and an environmental sensor.

4. The method of claim 1, wherein the plurality of first connected devices comprise at least one of a security system, a vehicle infotainment system, a streaming media device, a gaming device, an entertainment system, a networked lock, a connected thermostat, a connected furnace, a connected air conditioning system, an irrigation system, a water control system, a pump system, a utility meter, a network gateway, an activity sensor, a home alarm, security systems, vehicle infotainment systems, streaming media devices, gaming devices, a connected appliance, a connected vehicle, a mobile communication device, a wind turbine system, a solar panel system, and an industrial manufacturing system.

5. The method of claim 1 wherein the plurality of second connected device comprises at least one of a security system, a vehicle infotainment system, a streaming media device, a gaming device, an entertainment system, a networked lock, a connected thermostat, a connected furnace, a connected air conditioning system, an irrigation system, a water control system, a pump system, a utility meter, a network gateway, an activity sensor, a home alarm, security systems, vehicle infotainment systems, streaming media devices, gaming devices, a connected appliance, a connected vehicle, a mobile communication device, a wind turbine system, a solar panel system, and an industrial manufacturing system.

6. The method of claim 1, wherein identifying the at least one anomalous condition comprises generating at least one anomalous condition decision function based on the first operational data.

7. The method of claim 6, wherein identifying the at least one anomalous condition further comprises comparing the second operational data with the at least one anomalous condition decision function.

8. The method of claim 1, wherein the data service provider comprises a weather data search.

* * * * *